United States Patent [19]
Saller et al.

[11] Patent Number: 6,161,019
[45] Date of Patent: Dec. 12, 2000

[54] COMMUNICATION SYSTEM WITH CORDLESS SYSTEM UNITS CONNECTED TO A COMMUNICATION NETWORK

[75] Inventors: Franz Saller, Neuried; Markku Korpi, Starnberg; Emmeran Vollert, Grosshöhenrain, all of Germany

[73] Assignee: Siemens Aktiengesellschaft, Munich, Germany

[21] Appl. No.: 09/029,174

[22] PCT Filed: Aug. 9, 1996

[86] PCT No.: PCT/DE96/01501

§ 371 Date: Feb. 27, 1998

§ 102(e) Date: Feb. 27, 1998

[87] PCT Pub. No.: WO97/08908

PCT Pub. Date: Mar. 6, 1997

[30] Foreign Application Priority Data

Aug. 28, 1995 [DE] Germany .......................... 195 31 612

[51] Int. Cl.[7] .................................................. H04Q 7/00
[52] U.S. Cl. ........................ 455/463; 455/435; 455/464
[58] Field of Search .................................. 455/422, 432, 455/433, 434, 435, 458, 445, 462, 463, 464, 465, 44

[56] References Cited

U.S. PATENT DOCUMENTS 5,613,199  3/1997  Yahagi ..................................... 455/435

5,628,051  5/1997  Salin ....................................... 455/435

FOREIGN PATENT DOCUMENTS 0 647 077 A2  4/1995  European Pat. Off. .
9300044 U  5/1993  Germany .

OTHER PUBLICATIONS

Prentice Hall, Chapter 2, Robert W. Klessig, Ph. D. et al, 1995, "SMDS Wide–Area Data Networking with Switched Multi–Megabit Data Service," pp. 11–14.

*Primary Examiner*—Thanh Cong Le
*Attorney, Agent, or Firm*—Hill & Simpson

[57] ABSTRACT

A communication system has cordless system units (1, 2, 3, 4) connected to a communication network (7). The cordless system units respectively has at least one cordless base station (11–13, 21–23, 31, 32, 41). The identification of a respective cordless terminal equipment (8) is stored in a cordless system unit (1, 2, 3, 4) allocated thereto as a home system unit. The possibility or, respectively, allowability of a connection setup from the respective cordless system unit (1, 2, 3, 4) to a cordless terminal equipment (8) can be checked by a check apparatus (15, 25, 35, 45) respectively allocated to the cordless system units (1, 2, 3, 4). The cordless system units (1, 2, 3, 4) are connected to a network (6, 61) offering a connectionless service in order to exchange information with one another dependent on check results of the check apparatus (15, 25, 35, 45).

11 Claims, 1 Drawing Sheet

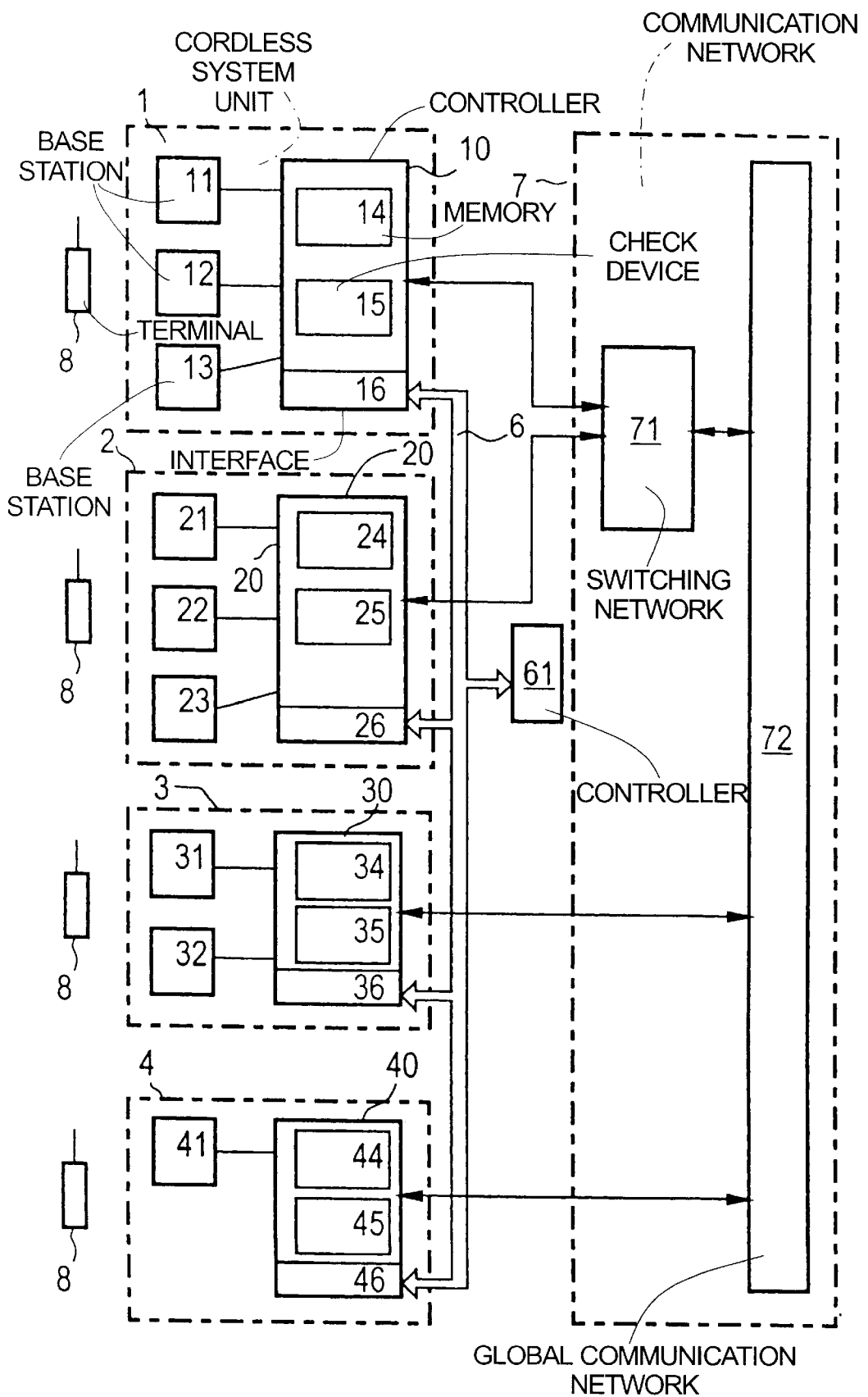

COMMUNICATION SYSTEM WITH CORDLESS SYSTEM UNITS CONNECTED TO A COMMUNICATION NETWORK

BACKGROUND OF THE INVENTION

The invention is directed to a communication system.

Such a communication system is disclosed by European reference EP-0 433 256-A2. In this communication system, a cordless terminal equipment is normally authorized for connections via a specific cordless system unit. Cordless system units serve for connecting cordless terminal equipment to a communication network. Such a communication network can be a private branch exchange that is in turn usually connected to a regional or global network. In some instances, a cordless system unit itself can fulfill jobs of a private branch exchange.

A cordless system unit controls the recognition of the presence of an operational cordless terminal equipment in the transmission and reception area of one of its base stations and the routing of a connection setup to this terminal equipment via this base station (roaming according to ETS 300 175-3). To this end, it contains a check means for checking whether a connection setup from it to a cordless terminal equipment is possible. Such a connection setup is possible when an information exchange between at least one of the base stations of the cordless system unit and the cordless terminal equipment can be technically implemented via the cordless transmission/reception link. Given an information exchange by analog signal transmission, one criterion therefor can be the achieving of an adequately high reception signal level and, given an information exchange by digital signal transmission, can be the achieving of an adequately low bit error rate. Whether a connection setup is possible is essentially dependent on whether the cordless terminal equipment is operationally located in the transmission and reception area of a base station of the cordless system unit.

Given an existing connection between the cordless terminal equipment and a communication network connected to the cordless system unit, the cordless system unit—in conjunction with its base stations—controls the connection setup via the one base station and the new connection setup via the other base station given an area change of the cordless terminal equipment from one base station to a neighboring base station (handover according to ETS 300 175-3).

In order to monitor the access authorization of a cordless terminal equipment to the communication system and in order to monitor whether a cordless terminal equipment is authorized to initiate a connection setup via the cordless system unit, the check means checks the permissibility of such a connection setup. A cordless terminal equipment is usually authorized to initiate a connection setup via a cordless system unit when this is administratively allocated to it as home system unit. When a cordless system unit is allocated to a cordless terminal equipment as home system unit, then its identification is stored in it.

Base stations serve first and foremost for the bidirectional conversion of cordlessly transmitted signals and signals transmitted wire-bound. For example, a cordless signal transmission can be undertaken by infrared signal or by radio. For example, the DECT method described in the ETS 300 175 can be cited as a radio transmission method. A cordless system unit can have one or more base stations.

When, in a communication known from European reference EP-0 433 256-A2, a cordless terminal equipment is to be operated in the transmission and reception area of a cordless system unit that is not allocated to it as home system unit, then it must be reported at the administration of this system unit. To this end, every cordless system unit keeps a defined plurality of telephone numbers on hand that cannot be assigned to permanently allocated terminal equipment.

In such a communication system, consequently, a cordless terminal equipment can only be operated in the transmission and reception area of its home system unit or in the transmission and reception area of a cordless system unit at which it is temporarily administratively reported. The initiation of a connection setup by this cordless terminal equipment is deemed allowable by the check means of a cordless system unit only in these cases. The number of terminal equipment that can be signed on per administration for a cordless system unit in addition to the permanently allocated cordless terminal equipment is limited by the number of telephone numbers offered for these purposes. Since the individual cordless system units must offer additional free telephone numbers for the temporary logon of cordless terminal equipment, the installed resources of the communication system cannot be optimally exploited.

SUMMARY OF THE INVENTION

An object of the invention is to offer a communication system that enables a simple access of cordless terminal equipment to the communication system in the transmission and reception area of arbitrary cordless system units.

The inventive communication system contains cordless system units connected to a communication network, each of the cordless system units having at least one cordless base station. The identification of a respective cordless terminal equipment is stored in a cordless system units allocated thereto as a home system unit. The possibility or, respectively, allowability of a connection setup from the respective cordless system unit to a cordless terminal equipment can be checked by a check means respectively allocated to the cordless system units. The cordless system units are connected to a network offering a connectionless service in order to exchange information with one another dependent on check results of the check means.

Due to the communication of the information between the cordless system units via a network offering a connectionless service, a point-to-multipoint inquiry can be communicated to all cordless system units belonging to the communication system without an involved layer-3 signaling.

When, for example, the check by the check means of the home system unit determines that a called cordless terminal equipment is not located in its transmission and reception area, then the home system unit can inquire in a simple way at all connected cordless system units via the network offering a connectionless service whether a connection setup to the cordless terminal equipment is possible from the check means of any other cordless system unit of the communication system. When the cordless terminal equipment is located in the transmission/reception area of a base station of another cordless system unit, this informs the communication system, potentially via the network offering the connectionless service, and informs the home system unit, and the communication system can connect the incoming call to the called cordless terminal equipment. Such a connection setup can thereby be conducted via the home system unit and an additional connection from the home system unit to the cordless system unit in whose area the terminal equipment is located. In most cases—particularly when the home system unit and the cordless system unit in whose area the terminal equipment is located are connected to the same switching network of, for example, a private branch exchange—, however, it is advantageous to connect the incoming call directly via the cordless system unit in whose area the terminal equipment is located. The arising call data can then be communicated between this system unit and the home system unit via the network offering the connectionless service.

When, for example, a cordless terminal equipment that is located in the transmission/reception area of a base station of a cordless system unit that is not allocated to it as home system unit wants access to the communication system in order to initiate a connection setup, then the allowability check by the check means of these cordless system unit shows that the identification of this cordless terminal equipment is not stored at it. In this case, the cordless system unit can inquire in a simple at all connected cordless system units via the network offering a connectionless service whether the cordless terminal equipment has authorization to access the communication system, i.e. whether its identification is stored in any cordless system units of the communication system. When a cordless system unit of the communication system is home system unit of the cordless terminal equipment, this can communicate corresponding information to the inquiring cordless system unit via the network offering a connectionless service. This can subsequently enable an access of the cordless terminal equipment to the communication system. The arising call data can then be communicated between this system unit and the home system unit via the network offering the connectionless service.

Connectionless service here means connectionless with respect to layer 2 and, potentially, layer 3 according to the OSI reference model (ISO 7498 of 1993).

For example, a datagram-oriented local network referred to as LAN (from the English local area network) can be provided as a network offering connectionless service. The Ethernet defined in the standardization publications IEEE 802.3 and IEEE 802.5 can be cited as an example of a datagram-oriented local network. When the individual cordless system units of the communication system are arranged at a great spacing from one another in a regional or global company network, the network offering a connectionless service can be composed of two or more local networks that form a network union via dedicated lines or via a regional or global network. Such networks offering a connectionless service are described, for example, in the book *SMDS Wide-Area Data Networking with Switched Multi-megabit Data Service* by R. W. Klessig and K. Tesink, Prentice Hall, 1995, particularly pages 11 through 14.

Preferably, the overall network offering a connectionless service contains a single controller for the monitoring of the access authorization of connected cordless system units to this network and for rejecting unauthorized access attempts. This controller can be realized, for example, by a central computer that monitors the coupling of remote cordless system units or of remote local networks of the network offering a connectionless service to a central network and can thus reject an unauthorized data exchange.

The receiving and sending of information by a party not authorized to do so that is authorized to access the network is very easily possible in datagram-oriented networks. For security reasons, particularly to prevent an unauthorized access to the communication system, it is therefore recommendable to provide a separate datagram-oriented network that serves exclusively for the information exchange between cordless system units. When such a separate datagram-oriented network is composed of a plurality of local networks arranged at a great distance from one another, then remote local networks or individual, remote cordless system units as well are connected to a central local network, preferably via a permanently set up point-to-point connection such as, for example, a dedicated line, in order to prevent an unauthorized access via a datagram-oriented long-distance network.

In order to connect individual, remote cordless system units to the communication system, the connection between the separate datagram-oriented network and these remote cordless system units that is required in the physical layer of the network offering a connectionless service can also be realized as a dialed connection as needed. In this case, the controllers of the cordless system units and/or the central controller of the datagram-oriented network must initiate the required connection setup.

As an exemplary embodiment of the invention, the single FIGURE shows a communication system with cordless system units 1, 2, 3 and 4 connected to a communication network 7. Each of the cordless system units 1, 2, 3 and 4 has a controller 10, 20, 30 and 40 as well as base stations 11, 12, 13, 21, 22, 23, 31, 32 and 41. In the illustrated exemplary embodiment, the cordless system units 1 and 2 each have respectively three base stations 11, 12, 13 and 21, 22, 23, the cordless system unit 3 has two base stations 31 and 32, and the cordless system unit 4 has one base station 41. The controller 10, 20, 30, 40 of each cordless system unit 1, 2, 3, 4 contains a check means 15, 25, 35, 45 as well as a memory means 14, 24, 34, 44 unto which the identification of the cordless terminal equipment 8 to which the cordless system unit 1, 2, 3, 4 is allocated as home system unit is respectively programmed. A single cordless terminal equipment 8 is shown in the exemplary embodiment.

The cordless system units 1, 2, 3 and 4 shown in the single FIGURE are respectively connected via an interface arrangement 16, 26, 36, 46 to a network 6 offering a connectionless service. In the exemplary embodiment of the FIGURE, this network 6 offering a connectionless service is controlled by a central control means 61, for example a microcomputer.

In the illustrated exemplary embodiment, the cordless system units 1 and 2 are respectively connected to the switching network 71 of a private branch exchange, and this switching network 71 is connected to a global communication network 72. The cordless system units 3 and 4 are respectively directly connected to the global communication network 72.

The functioning of a communication system according to the exemplary embodiment of the single FIGURE is described below given the assumption that the cordless system unit 1 is allocated to the cordless terminal equipment 8 as home system unit, and that the cordless terminal equipment 8 is located in the transmission and reception area of one of the base stations 31 and 32 of the cordless system unit 3 and is operational.

When an attempt is made in the described case proceeding from the cordless terminal equipment 8 to initiate a connection setup via the cordless system unit 3 to the communication network 7, then the check means 35 checks on the basis of the memory entries in the memory 34 whether it is the home system unit of the cordless terminal equipment 8. Since this is not the case, an inquiry as to whether the connection setup requested by the cordless terminal equipment 8 is allowable is communicated to the other system units 1, 2 and 4 of the communication system via the interface arrangement 36 and the network 6 offering a connectionless service. This inquiry proceeding over the interface arrangement 16 to the controller 10 of the cordless system unit 1 leads to a check by the check means 15 of this system unit 1. The access attempt by the cordless terminal equipment 8 is found to be allowable in the system unit 1. The controller 10 of the cordless system unit 1 subsequently communicates the information that the access attempt is allowable to the cordless system unit 3 via the interface arrangement 16, the network 6 offering a connectionless service and via the interface arrangement 36 and—when necessary—also communicates further information required for a connection setup. As a result thereof, the system unit 3 treats the cordless terminal equipment 8 as though it were allocated to it as home system unit.

The control unit 61 monitors all said accesses onto the network 6 offering a connectionless service as to their allowability.

When, in the aforementioned case, the inquiry for a connection setup to the cordless terminal equipment 8 arrives at the cordless system unit 1 via the global network 72 and the switching network 71 of the private branch exchange, then the check means 15 of the cordless system unit 1 checks whether a connection setup to the cordless terminal equipment 8 is possible. In the described case, such a connection setup via the cordless system unit 1 is not possible. In response thereto, the controller 10 of the cordless system unit 1 communicates an inquiry to the cordless system units 2, 3 and 4 via the interface arrangement 16 and the network 6 offering a connectionless service as to whether a connection setup to the cordless terminal equipment 8 is possible via these cordless system units 2, 3 and 4. This inquiry proceeds via the interface arrangement 36 to the controller 30 of the cordless system unit 3, whereupon the check means 35 thereof checks whether the requested connection setup is possible. The positive check result is communicated via the interface arrangement 36, the network 6 and the interface arrangement 16 to the controller 10 of the cordless system unit 1. In response thereto, the controller 10 of the cordless system unit 1 initiates a connection setup to the cordless terminal equipment 8 via the cordless system unit 1.

BRIEF DESCRIPTION OF THE DRAWING

The features of the present invention which are believed to be novel, are set forth with particularity in the appended claims. The invention, together with further objects and advantages, may best be understood by reference to the following description taken in conjunction with the accompanying drawing, in which:

The single FIGURE depicts an exemplary embodiment of the present invention.

DESCRIPTION OF THE PREFERRED EMBODIMENTS

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

What is claimed is:

1. A communication system comprising:

cordless system units connected to a communication network each of said cordless system units respectively comprising at least one cordless base station and a check apparatus;

a respective cordless terminal equipment having an identity that is stored in one of said cordless system units allocated to said cordless terminal equipment as a home system unit, and whereby an allowance of a connection setup from the respective cordless system unit to a cordless terminal equipment being checked by a check apparatus respectively allocated to the cordless system units; and a network offering a connectionless service for bidirectionally exchanging information between said cordless system units via said network, said cordless system units being connected to said network, and said information being exchanged dependent on check results of one of said check apparatuses.

2. The communication system according to claim 1, wherein the network offering a connectionless service is a datagram-oriented network.

3. The communication system according to claim 2, wherein the datagram-oriented network is exclusively provided for the information exchange between cordless system units.

4. The communication system according to claim 2, wherein the datagram-oriented network is a local network.

5. The communication system according to claim 2, wherein the datagram-oriented network is composed of at least two coupled local networks.

6. The communication system according to claim 2, wherein the datagram-oriented network has a single controller for monitoring access authorization of connected cordless system units onto said network and for rejecting unauthorized access attempts.

7. The communication system according to claim 6, wherein the datagram-oriented network has a central local network to which at least one of remote cordless system units and remote local networks of the datagram-oriented network are respectively coupled via a permanent point-to-point connection.

8. The communication system according to claim 3, wherein the datagram-oriented network is a local network.

9. The communication system according to claim 3, wherein the datagram-oriented network is composed of at least two coupled local networks.

10. The communication system according to claim 3, wherein the datagram-oriented network has a single controller for monitoring access authorization of connected cordless system units onto said network and for rejecting unauthorized access attempts.

11. The communication system according to claim 10, wherein the datagram-oriented network has a central local network to which at least one of remote cordless system units and remote local networks of the data-oriented network are respectively coupled via a permanent point-to-point connection.

* * * * *